United States Patent Office 3,597,399
Patented Aug. 3, 1971

3,597,399
PROCESS FOR RETARDING THE HARDENING OF EPOXIDE RESINS UTILIZING SULFO COMPOUNDS AND RETARDING COMPOSITIONS
Edgar Lieske, Dusseldorf, and Erwin Weinrich, Dusseldorf-Holthausen, Germany, assignors to Henkel & Cie GmbH, Dusseldorf-Holthausen, Germany
No Drawing. Filed Apr. 22, 1969, Ser. No. 818,421
Claims priority, application Switzerland, Apr. 29, 1968, 6,341/68; Germany, Feb. 1, 1969, P 19 04 934.4
Int. Cl. C08g 30/12
U.S. Cl. 260—77.5     11 Claims

ABSTRACT OF THE DISCLOSURE

A process for retarding the hardening of an epoxide resin at elevated temperature which comprises admixing a retarding amount of a sulfo compound having the formula $$R(O)_n-SO_2-X$$

wherein X represents a member selected from the group consisting of lower alkoxy, hydroxyl and chlorine, $n$ represents an integer selected from the group consisting of 0 and 1 and R represents a member selected from the group consisting of $NH_2-$ and organic radicals, to a hardenable mixture of (1) a hardenable epoxide compound containing more than one epoxide group in the molecule and (2) an organic polycarboxylic acid anhydride epoxide resin hardener, said hardenable mixture being maintained at a temperature sufficient to cause an epoxide resin hardening reaction. The compositions containing the sulfo compounds delay the hardening of the hardenable epoxide resin mixture for varying times depending on the amount of retarding compound utilized as well as the hardenable epoxide resin and the temperature.

THE PRIOR ART

Hardenable mixtures of a hardenable epoxide compound containing more than one epoxide group in the molecule and an organic polycarboxylic acid anhydride epoxide resin hardener have a definite period of reaction where they become more viscous and finally harden. For many purposes the hardenable mixtures must have work performed on them before they harden. This period of reaction is sometimes called the "pot life" and depends on the type or structure of the hardenable epoxide compound and the organic polycarboxylic acid anhydride, as well as the degree of purity of these compounds and further factors such as the temperature, size of the batch, etc. It is frequently desirable to prolong the period of reaction of such hardenable mixtures.

OBJECTS OF THE INVENTION

An object of the present invention is the development of a method of prolonging the period of reaction of hardenable mixtures based on hardenable epoxide resin compounds.

Another object of the invention is the development of a process for retarding the hardening of an epoxide resin at elevated temperatures which comprises admixing a retarding amount of a sulfo compound having the formula $$R(O)_n-SO_2-X$$

wherein X represents a member selected from the group consisting of lower alkoxy, hydroxyl and chlorine, $n$ represents an integer selected from the group consisting of 0 and 1 and R represents a member selected from the group consisting of $NH_2-$ and organic radicals, to a hardenable mixture of (1) a hardenable epoxide compound containing more than one epoxide group in the molecule and (2) an organic polycarboxylic acid anhydride epoxide resin hardener, said hardenable mixture being maintained at a temperature sufficient to cause an epoxide resin hardening reaction.

A further object of the invention is the obtention of a hardenable epoxide resin composition comprising a mixture of (1) a hardenable epoxide compound containing more than one epoxide group in the molecule, (2) an organic polycarboxylic acid anhydride epoxide resin hardener, the ratio of said epoxide compound to said acid anhydride being such that from 0.6 to 1.2 polycarboxylic acid anhydride groups are present for each epoxide group, and (3) a retarding amount of a sulfo compound having the formula $$R(O)_n-SO_2-X$$

wherein X represents a member selected from the group consisting of lower alkoxy, hydroxyl and chlorine, $n$ represents an integer selected from the group consisting of 0 and 1 and R represents a member selected from the group consisting of $NH_2-$ and organic radicals.

These and other objects of the invention will become more apparent as the description thereof proceeds.

DESCRIPTION OF THE INVENTION

It is now been found that the reaction period of hardenable mixtures of a hardenable epoxide compound containing more than one epoxide group in the molecule and an organic polycarboxylic acid anhydride epoxide resin hardener may be prolonged if a sulfo compound having the formula $$R(O)_n-SO_2-X$$

is added to the hardenable mixtures in an amount sufficient to effect the desired delay.

The sulfo compound utilized according to the invention has the formula $$R(O)_n-SO_2-X$$

wherein X represents a hydroxyl group, a chlorine or a lower alkoxy group, $n$ represents either 0 or 1 and R represents $NH_2-$ or an organic radical. When R is an organic radical it can be aromatic or aliphatic or cycloaliphatic or heterocyclic. Other non-interfering substituents may be present on the organic radical such as amino and substituted amino groups, halogens, ether groups, aldehyde groups, hydroxyls, sulfonic acid groups, carboxylic acid groups, carboxylic acid ester groups, nitro groups, etc. Preferentially, when $n$ is 0, R can be $NH_2$; alkyl having 1 to 22 carbon atoms; carboxyalkyl having 2 to 22 carbon atoms; hydroxyalkyl having 2 to 22 carbon atoms; alkenyl having 2 to 22 carbon atoms. Sulfoalkyl having 1 to 22 carbon atoms; aldehydealkyl having 4 to 22 carbon atoms; dicarboxyalkyl having 4 to 22 carbon atoms; haloalkyl having from 1 to 22 carbon atoms; aminoalkyl having from 3 to 22 carbon atoms; nitroalkyl having from 2 to 22 carbon atoms; alkoxyalkyl having from 3 to 22 carbon atoms; phenyl, naphthyl, diphenyl, diphenylalkane and these aromatic radicals substituted by halogen, amino, sulfonic acid groups, hydroxyl, carboxylic acid groups, carbalkoxy groups, hydrazine groups, nitro groups, alkyl having 1 to 22 carbon atoms, alkenyl having 2 to 24 carbon atoms; cyclohexyl, camphoryl and these cycloaliphatic radicals substituted by halogen, lower alkyl; quinolyl and quinolyl substituted by halogen, hydroxy. When $n$ is 1, R is preferentially alkyl having from 1 to 22 carbon atoms. Polymeric compounds containing sulfonic acid groups may also be employed. Preferably the sulfo compound are utilized in the hardenable mixtures in amounts of from 0.001% to 3% by weight, based on the amount of the hardenable epoxide compound present in the mixtures.

The retarding additive sulfo compounds of the invention are most widely varied. Amidosulfonic acid (sulfaminic acid) and dimethyl sulfate may be utilized with success. Furthermore, substituted, as well as unsubstituted, aliphatic, cycloaliphatic, aromatic or heterocyclic mono- or polysulfonic acids or their esters with lower alkanols may be employed.

As unsubstituted aliphatic sulfonic acids which optionally may have two sulfonic acid groups are the following: alkanesulfonic acids having 1 to 22 carbon atoms, for example, methanesulfonic acid, ethanesulfonic acid, butanesulfonic acid, pentanesulfonic acid, hexanesulfonic acid, octanesulfonic acid, decanesulfonic acid, dodecanesulfonic acid, tetradecanesulfonic acid, hexadecanesulfonic acid, octadecanesulfonic acid, docosanesulfonic acid. Technical mixtures of compounds having —$SO_3H$ groups prepared by sulfoxidation or sulfochlorination of saturated or unsaturated aliphatic hydrocarbons may be employed. Also suitable are alkenesulfonic acids having from 2 to 2 2carbon atoms such as pentenesulfonic acid and isobutylenesulfonic acid. As cycloaliphatic sulfonic acids may be considered cyclohexylsulfonic acid, camphorylsulfonic acid and their lower alkyl and halogen substituted derivatives such as bromocamphorylsulfonic acids. Among the suitable aliphatic disulfonic acids are alkanedisulfonic acids such as methionic acid, propane-1,2-disulfonic acid, etc.

The alkyl radicals of the above aliphatic sulfonic acids may also contain further substituents such as hydroxyl groups, ether linkages, aldehyde groups, carboxyl groups, carbalkoxy groups, halogens, amino groups, alkylamino groups and nitro groups. The following sulfonic acids may be considered under the category of substituted aliphatic sulfonic acids: isethionic acid, 2- and 3-hydroxypropanesulfonic acid, 4-hydroxybutanesulfonic acid, hydroxyoctanesulfonic acid, 5-hydroxypentanesulfonic acid, isobutyraldehyde sulfonic acid, sulfoacetic acid, sulfopropionic acid, sulfosuccinic acid, sulfolauric acid, sulfopalmitic acid, sulfostearic acid, chloromethanesulfonic acid, bromomethanesulfonic acid, dibromomethanesulfonic acid, 4-aminobutanesulfonic acid, 2-nitropropane-1-sulfonic acid. Finally also the acid esters of sulfuric acid with fatty alcohols having a chain length of about 12 to 18 carbon atoms may be considered.

The aromatic sulfonic acids to be utilized, according to the invention, can either be unsubstituted, or contain as substituents, for instance, alkyl groups, hydroxyl groups, carboxyl groups, carbalkoxy groups, halogen, amino groups, alkylamino groups, hydrazine groups, and nitro groups. Thus the following are to be considered among others: benzenesulfonic acid, α- and β-naphthalenesulfonic acid, o- and p-toluenesulfonic acid, dodecylbenzenesulfonic acid, tetradecylbenzenesulfonic acid, 2-amino-5-chloro-p-toluenesulfonic acid, N-alkyl-5-sulfoanthranilic acid, α-(N-ethylanilino)-m-toluenesulfonic acid, 4 - amino - 3-nitro-benzenesulfonic acid, p-hydrazinobenzenesulfonic acid, benzene - 1,3 - disulfonic acid, 1,5-naphthalenesulfonic acid, m-cresol-sulfonic acid, 2-methoxyphenol-4-sulfonic acid, 1-naphthol-2,4,7-trisulfonic acid, 2-naphthol-3-6-disulfonic acid, 2-naphthol-6,8-disulfonic acid, mixtures of 1,5-anthraquinonedisulfonic acid and 1,8-anthraquinonedisulfonic acid, benzoic acid-2,4-disulfonic acid, 5-sulfo-2-naphthoic acid, p-aminobenzenesulfonic acid. N,N-dimethylaniline - 3 - sulfonic acid, N,N-dimethylaniline - 4 - sulfonic acid, aniline-2,5-sulfonic acid, 4-aminotoluene-3-sulfonic acid, 1-amino-2-hydroxynaphthalene - 4-sulfonic acid, α-naphthylamine-4-sulfonic acid, mixtures of naphthylamine-6-sulfonic acid and naphthylamine - 7 - sulfonic acid, 4-amino-diphenyl-3-sulfonic acid, benzidine-disulfonic acid, p-chlorobenzenesulfonic acid, p-bromobenzenesulfonic acid, 1-chlorobenzene-2,4-disulfonic acid, 2-nitro-4-chloro-benzene - 3 - sulfonic acid, 4-nitrophenolsulfonic acid, 2-nitronaphthalene-1,8-disulfonic acid, etc.

Also heterocyclic sulfonic acids are suitable in the process of the invention, as for example, quinoline-8-sulfonic acid, 8-hydroxyquinoline-5-sulfonic acid, 7-iodo-8-hydroxyquinoline-5-sulfonic acid, etc.

Also suitable are polymers containing sulfonic acids groups as for instance polystyrene containing sulfonic acids residues, or also other acid ion exchangers containing-$SO_3H$ groups. Furthermore polymers or copolymers of vinylsulfonic acid may be utilized.

Finally, also acid sulfuric acid esters may be employed in accordance with the invention, as for example, octyl acid sulfate, hexadecyl acid sulfate, octadecyl acid sulfate, etc. Furthermore, esters or acid chlorides of the abovementioned sulfonic acids may be employed in accordance with the invention, as for example, methanesulfonic acid chloride, benzenesulfonic acid chloride, toluenesulfonic acid chloride or also methyl or ethyl or propyl esters of toluenesulfonic acid.

By preliminary tests, the optimum amount of the retarding additives to be used in accordance with the invention can be easily found. It is advantageous, that the retarding additives according to the invention to be soluble in the respective mixtures of the epoxide compound and the anhydride hardener.

The retarding additives of the invention are suitable for addition to hardenable mixtures of all conventional hardenable epoxide compounds containing more than one epoxide group in the molecule and all organic polycarboxylic acid anhydrides known as epoxide resin hardeners. The period of the delay of the hardening reaction depends, among other conditions, on the type of epoxide compound. Generally hardenable mixtures containing epoxide compounds which have a short duration of the period of hardening reaction are more strongly influenced by the retarding additives than mixtures containing epoxide compounds which have a longer duration of the period of the hardening reaction.

The addition of retarding additives to hardenable mixtures of glycidyl isocyanurate particularly crystalline triglycidyl isocyanurate and anhydrides of polycarboxylic acids, causes a particularly strong retarding effect.

As hardenable epoxide compounds containing more than one epoxide group in the molecule, for example, glycidyl ethers of polyhydric phenols, cycloaliphatic epoxide compounds and triglycidyl isocyanurates can be used.

Suitable glycidyl ethers of polyhydric phenols are, for example, diglycidyl ethers of dihydric phenols such as the glycidyl ether of diphenylolpropane (Bisphenol A) with an epoxide equivalent of 170 to about 4,000, the glycidyl ether of chlorinated, brominated or methylated diphenylolpropane as well as the glycidyl ether of hydroquinone or resorcinol. The epoxide equivalent of these latter epoxide compounds is preferably between 170 and 1,200. These glycidyl ethers of polyhydric phenols are produced by a reaction of the polyhydric phenol with epichlorohydrin.

As cycloaliphatic epoxide compounds having more than one epoxide group in the molecule are, for example, those which contain two epoxidized cyclohexene radicals in the molecule, such as 3,4-epoxy-hexahydro-6-methyltetrahydroxybenzyl 3′,4′-epoxy-6′-methylhexahydrobenzoate or the diepoxide of the acetal of cyclohexene aldehyde and 1,1-dimethylolcyclohexene. In addition, are cycloaliphatic epoxide compounds which contain more than half their epoxide groups attached to the cycloaliphatic ring system such as the glycidyl esters of cycloaliphatic polycarboxylic acid compounds, for example, the diglycidyl ester of hexahydrophthalic acid or tetrahydrophthalic acid.

In the case that triglycidyl isocyanurate is employed as an epoxide compound containing several epoxide groups in the molecule, this should preferably be crystalline and have an epoxide oxygen content of at least 14%.

The usual anhydrides of organic polycarboxylic acids can be employed as acid anhydride epoxide hardeners, for example, hexahydrophthalic acid anhydride, methylhexahydrophthalic acid anhydride, tetrahydrophthalic acid anhydride, phthalic acid anhydride, dodecenylsuccinic acid anhydride, pyromellitic acid anhydride, methylendomethylenetetrahydrophthalic acid anhydride, tetrachlorophthalic acid anhydride, adipic acid anhydride, sebacic acid anhydride and many others.

As a rule, the amount of the organic polycarboxylic acid anhydride epoxide hardener to be used as hardener with the hardenable epoxide compound should be measured so that 0.6 to 1.2, preferably 0.8 to 0.9, polycarboxylic acid anhydride groups are present in the hardenable mixture for each epoxide group.

By the use of the retarding additives of the invention, the delay in the period of the hardening reaction of the hardenable mixtures can be adjusted within well defined periods. In addition, it is possible to overcome the delaying or retarding effect on the hardening action by adding conventional accelerators to the hardenable mixtures. This gives the advantage that, for example in casting operations, the hardening process can be delayed in the event of unforeseen circumstances after the hardenable mixtures have been compounded, and thereafter this delaying effect can be cancelled by the addition of accelerators. Effective accelerators for this purpose are the known epoxide resin hardening accelerators, for example, tris-(dimethylaminomethyl)-phenol, dimethylbenzylamine, trimethylbenzylammonium chloride, etc.

In well known manner, dyes or fillers can be added to the mixtures prepared according to the invention, such as, for example, metallic powder, quartz powder, glass powder, glass fibers, mica, aluminum oxide, titanium oxide, ground dolomite or barium sulfate.

The hardenale epoxide resin compositions according to the invention can be easily obtained by melting together the epoxide compound containing at least one epoxide group in the molecule with the organic polycarboxylic acid anhydride employed as the hardening agent and with the retarding additives.

The hardening of the reaction mixtures is carried out in the usual manner at temperature of 80° to 250° C., particularly 100° to 200° C., depending on the ingredients.

The properties of the compositions used under this invention, in order to delay the period of the hardening reaction of the hardenable mixtures of epoxide compounds and polycarboxylic acid anhydrides, is indeed surprising, since, for example, acid ion exchange resins are known to be hardeners for epoxide resins, and, for example, toluenesulfonic acid may be used as an accelerating agent for the aminic hardening of epoxide resins.

The following examples will serve for better comprehension of the invention. However, they do not limit the scope of the invention in any manner.

EXAMPLES (A) 100 g. triglycidyl isocyanurate (epoxide equivalent 102) and 140 g. of hexadrophthalic acid anhydride were heated separately to a temperature of 120° C., then they were mixed and held in a constant bath at a temperature of 120° C.

The change of the viscosity was measured with a rotation viscosity meter. The time was measured, which was required, in order for the mixture to attain a viscosity of 1500 cp. The measurement was effected according to DIN 16 945 (isothermal viscosity curve). From this value, 10 minutes were deducted, and the value obtained was reported as the "Reactivity Value."

(B) In the same manner, at a temperature of 130° C., 100 g. of the diglycidyl ether of hexahydrophthalic acid (epoxide equivalent 165) and 85 g. of hexahydrophthalic acid anhydride were mixed, and the Reactivity Value was likewise measured.

(C) Likewise 150 g. of an epoxide resin based on diphenylolpropane (epoxide equivalent 398) were mixed with 52 g. of hexahydrophthalic acid anhydride. The change of the viscosity was determined 120° C. Since this mixture has a greater starting viscosity, the time for the attainment of 7500 cp. was selected as the end point.

As a comparison when the two ingredients were mixed in each of A, B and C, 1 g. of different sulfonic acid retarding additives were added and the various curves determined together with the "Reactivity Value." Table I gives the results obtained. In the first column the amount and type of retarding additive is listed and in the remaining columns, the reactivity values are given for each of the three hardenable mixtures A, B and C.

TABLE I

| Retarding additive | Reactivity values in minutes for tests | | |
|---|---|---|---|
| | A | B | C |
| None | 22 | 35 | 65 |
| 1 gram amidosulfonic acid | 1,920 | 1,080 | 90 |
| 1 gram sulfanilic acid | 100 | 77 | 80 |
| 1 gram p-toluene sulfonic acid | 218 | 660 | 90 |
| 1 gram β-naphthalenesulfonic acid | 1,500 | 1,200 | |

As a further comparison, to the two ingredients of A above and as they were mixed, were added 1 g. of different retarding additives and the reactivity values were determined. Table II gives the values obtained. In the first column the type of retarding additive is listed and the second column gives the reactivity values in minutes.

TABLE II

| Retarding additive, 1 gm. | Reactivity value in minutes |
|---|---|
| No additive | 22 |
| α-Sulfopalmitic acid | 3000 |
| α-Sulfostearic acid | 1500 |
| α-Hydroxyoctanesulfonic acid | 300 |
| Benzene-1,3-disulfonic acid | 2400 |
| p-Hydrazinobenzenesulfonic acid | 55 |
| Quinoline-8-sulfonic acid | 83 |
| 8-hydroxyquinoline-5-sulfonic acid dihydrate | 420 |
| 7-iodo-8-hydroxyquinoline-5-sulfonic acid | 600 |
| 1-amino-2-hydroxy-naphthalene-4-sulfonic acid | 360 |
| 8-amino-naphthalene-1,6-disulfonic acid | 112 |
| 4-amino-3-nitro-benzenesulfonic acid | 67 |
| α-(N-ethylanilino)-m-toluenesulfonic acid | 300 |
| 2-amino-5-chloro-p-toluenesulfonic acid | 1980 |
| N-ethyl-5-sulfo-anthranilic acid | 300 |
| 3-bromo-camphoryl-10-sulfonic acid monohydrate | 240 |
| Naphthionic acid (α-naphthylamine - 4 - sulfonic acid) | 80 |
| "Mersolate H" (a higher alkylsulfonic acid) | 290 |
| Polystyrene containing sulfonic acid groups | 40 |
| Hexadecyl-1 acid sulfate | 1740 |
| Methanesulfonic acid chloride | 286 |
| p-Toluenesulfonic acid chloride | 960 |
| Dimethyl sulfate | 1500 |
| p-Toluenesulfonic acid ethylester | 230 |

The preceding specific embodiments are illustrative of the practice of the invention. It is to be understood however, that other expedients known to those skilled in the art may be employed without departing from the spirit of the invention.

We claim:

1. A process for retarding the hardening of an epoxide resin at temperatures of from 80° C. to 250° C. which consists essentially of admixing from 0.001% to 3% by weight based on the amount of hardenable epoxide compound of a sulfo compound having the formula

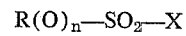

R(O)ₙ—SO₂—X wherein X represents a member selected from the group consisting of lower alkoxy, hydroxyl and chlorine, $n$ represents an integer selected from the group consisting of 0 and 1 and R represents a member selected from the group consisting of $NH_2$— and organic radicals, to a hardenable mixture of (1) a hardenable epoxide compound containing more than one vicinal epoxide group in the molecule and (2) an organic polycarboxylic acid anhydride epoxide resin hardener, the ratio of said epoxide compound to said acid anhydride being such that from 0.6 to 1.2 polycarboxylic acid anhydride groups are present for each epoxide group, said hardenable mixture being maintained at a temperature of from 80° C. to 250° C. and sufficient to cause an epoxide resin hardening reaction.

2. The process of claim 1 wherein said sulfo compound is an alkanesulfonic acid having from 1 to 22 carbon atoms.

3. The process of claim 1 wherein said sulfo compound is selected from the group consisting of aromatic hydrocarbon sulfonic acids and substituted aromatic hydrocarbon sulfonic acids.

4. The process of claim 1 wherein said sulfo compound is amidosulfonic acid.

5. The process of claim 1 wherein said sulfo compound is dimethylsulfate.

6. The process of claim 1 wherein said sulfo compound is α sulfopalmitic acid.

7. The process of claim 1 wherein said sulfo compound is benzene-1,3-disulfonic acid.

8. The process of claim 1 wherein said hardenable epoxide compound is crystalline triglycidyl isocyanurate.

9. A hardenable epoxide resin composition consisting essentially of a mixture of (1) a hardenable epoxide compound containing more than one vicinal epoxide group in the molecule (2) an organic polycarboxylic acid anhydride epoxide resin hardener, the ratio of said epoxide compound to said acid anhydride being such that from 0.6 to 1.2 polycarboxylic acid anhydride groups are present for each epoxide group, and (3) from 0.001% to 3% by weight based on the amount of hardenable epoxide compound of a sulfo compound having the formula $$R(O)_n\text{—}SO_2\text{—}X$$

wherein X represents a member selected from the group consisting of lower alkoxy, hydroxyl and chlorine, $n$ represents an integer selected from the group consisting of 0 and 1 and R represents a member selected from the group consisting of $NH_2$— and organic radicals, whereby the hardening of said hardenable epoxide resin is retarded at temperatures of from 80° C. to 250° C.

10. The composition of claim 9 wherein said sulfo compound is an alkanesulfonic acid having from 1 to 22 carbon atoms.

11. A process for delaying the hardening reaction period of a hardenable epoxide resin mixture at temperatures of from 80° C. to 250° C. and thereafter hardening said mixture which consists essentially of the steps of admixing from 0.001% to 3% by weight based on the amount of hardenable epoxide compound of a sulfo compound having the formula $$R(O)_n\text{—}SO_2\text{—}X$$

wherein X represents a member selected from the group consisting of lower alkoxy, hydroxyl and chlorine, $n$ represents an integer selected from the group consisting of 0 and 1 and R represents a member selected from the group consisting of $NH_2$— and organic radicals, to a hardenable mixture of (1) a hardenable epoxide compound containing more than one vicinal epoxide group in the molecule and (2) an organic polycarboxylic acid anhydride epoxide resin hardener, the ratio of said epoxide compound to said acid anhydride being such that from 0.6 to 1.2 polycarboxylic acid anhydride groups are present for each epoxide group, said hardenable mixture being maintained at a temperature of from 80° C. and 250° C. and sufficient to cause an epoxide resin hardening reaction, holding said mixture at said temperature for the desired period, adding an effective amount of an epoxide resin hardening accelerator and hardening said mixture.

References Cited

UNITED STATES PATENTS 2,643,243    6/1953    Dannenberg    260—47EPX

WILLIAM H. SHORT, Primary Examiner

T. E. PERTILLA, Assistant Examiner

U.S. Cl. X.R.

260—37, 47, 78.4